No. 764,783. PATENTED JULY 12, 1904.
S. F. VAN CHOATE.
APPARATUS FOR THE DISTRIBUTION AND PURIFICATION OF WATER OR SEWAGE.
APPLICATION FILED MAR. 23, 1903.
NO MODEL. 4 SHEETS—SHEET 1.

Witnesses.
P. W. Pezzetti
L. E. Kennedy

Inventor.
S. F. Van Choate
by Wright, Brown & Quinby
Attys.

No. 764,783. PATENTED JULY 12, 1904.
S. F. VAN CHOATE.
APPARATUS FOR THE DISTRIBUTION AND PURIFICATION OF WATER OR SEWAGE.
APPLICATION FILED MAR. 23, 1903.
NO MODEL. 4 SHEETS—SHEET 2.

Witnesses.
P. W. Pezzetti
L. E. Kennedy

Inventor.
S. F. Van Choate
by Wright, Brown & Quinby
Attys.

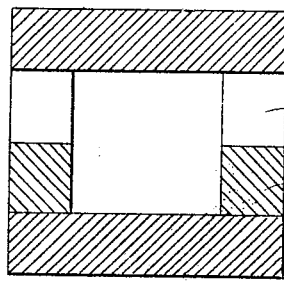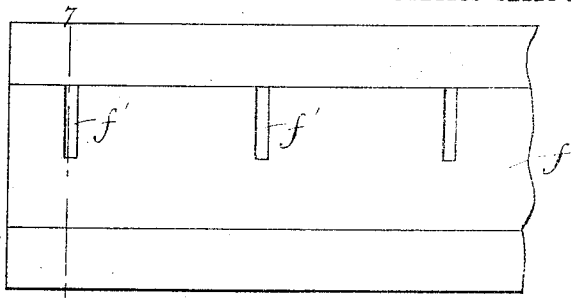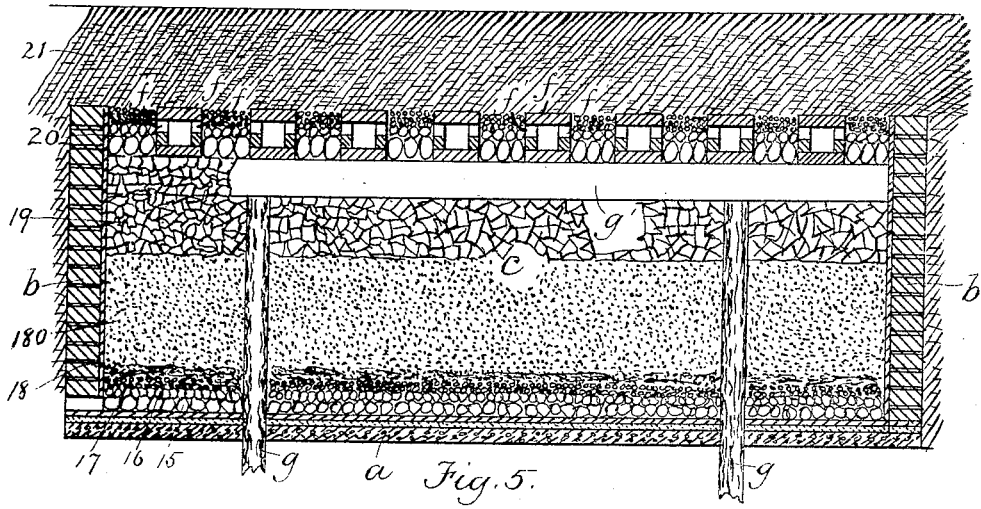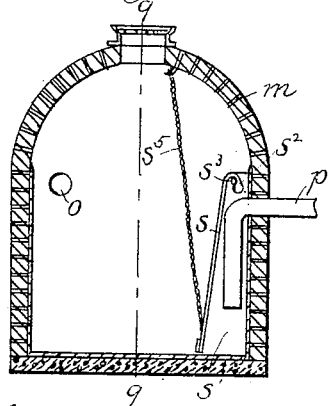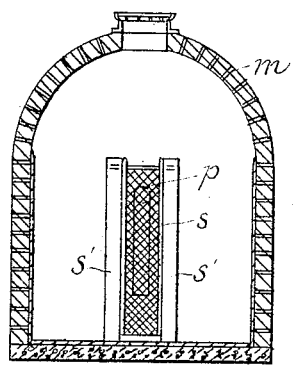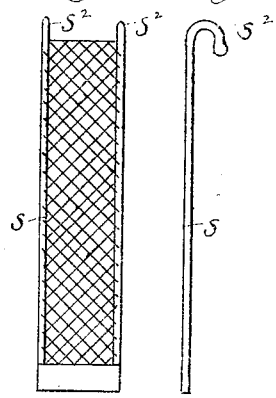

No. 764,783. PATENTED JULY 12, 1904.
S. F. VAN CHOATE.
APPARATUS FOR THE DISTRIBUTION AND PURIFICATION OF WATER OR SEWAGE.
APPLICATION FILED MAR. 23, 1903.
NO MODEL. 4 SHEETS—SHEET 4.

Witnesses.
Inventor
S. F. Van Choate

No. 764,783.                                                    Patented July 12, 1904.

UNITED STATES PATENT OFFICE.

SILVANUS F. VAN CHOATE, OF BOSTON, MASSACHUSETTS, ASSIGNOR TO BASILIO CROCI, OF BOSTON, MASSACHUSETTS.

APPARATUS FOR THE DISTRIBUTION AND PURIFICATION OF WATER OR SEWAGE.

SPECIFICATION forming part of Letters Patent No. 764,783, dated July 12, 1904.

Application filed March 23, 1903. Serial No. 149,015. (No model.)

*To all whom it may concern:*

Be it known that I, SILVANUS F. VAN CHOATE, of Boston, in the county of Suffolk and State of Massachusetts, have invented certain new and useful Improvements in Apparatus for the Distribution and Purification of Water or Sewage, of which the following is a specification.

This invention relates to apparatus for separating from water any deleterious or objectionable matter carried thereby, either to render it innocuous when discharged into streams or watercourses, as the effluent from a sewerage system, or to adapt it for domestic purposes.

The object of the invention is to furnish a practical, inexpensive, and efficient water and sewage distribution and purification system adapted for domestic and public uses.

The following description and specification, with a reference to the accompanying drawings, will enable any one skilled in the art to understand, construct, and operate this system.

The invention consists as a whole in the improved apparatus hereinafter described and in certain parts or elements thereof, all as set forth in the following specification and claims.

Figure 1:
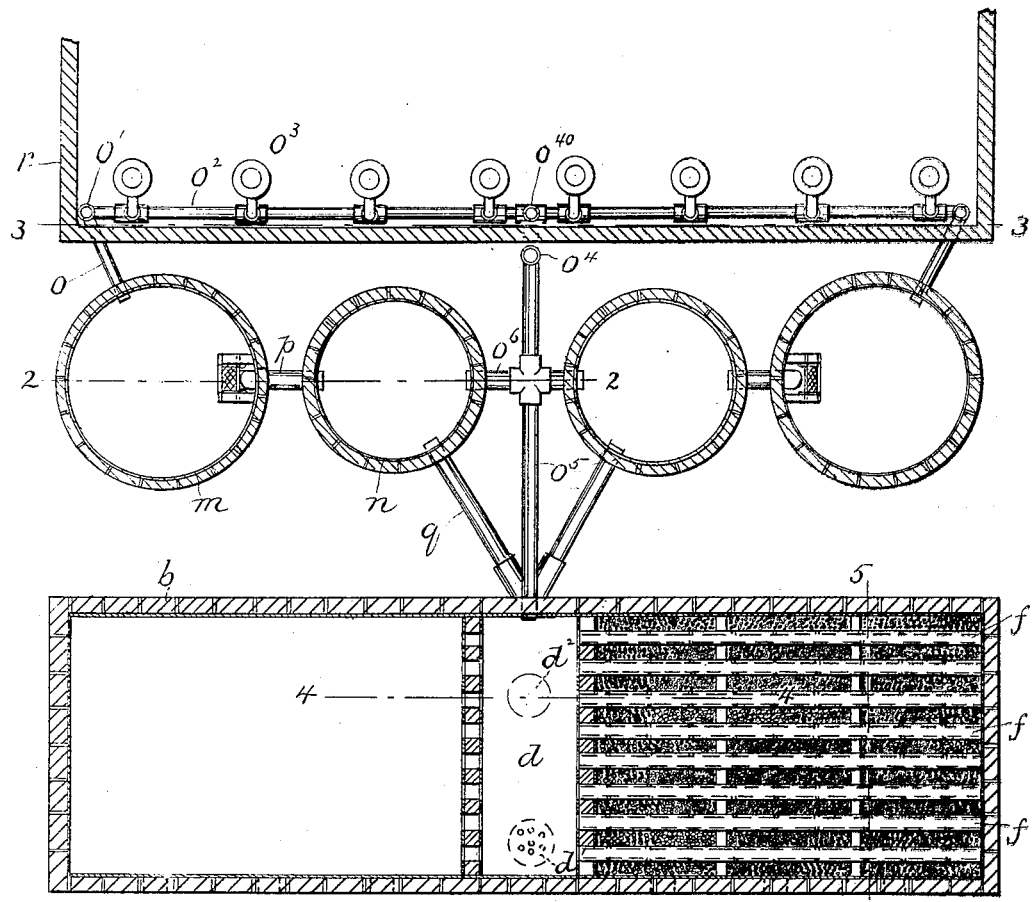
Figure 2:
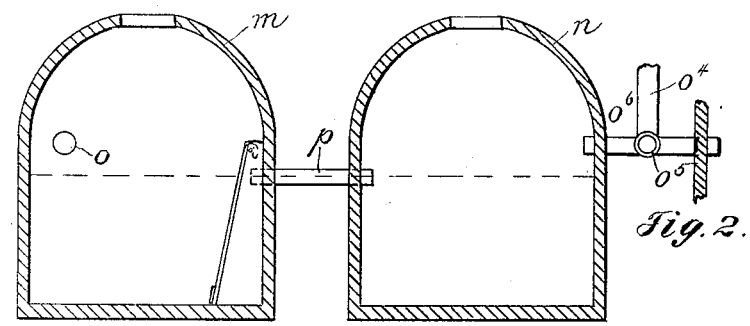
Figure 3:
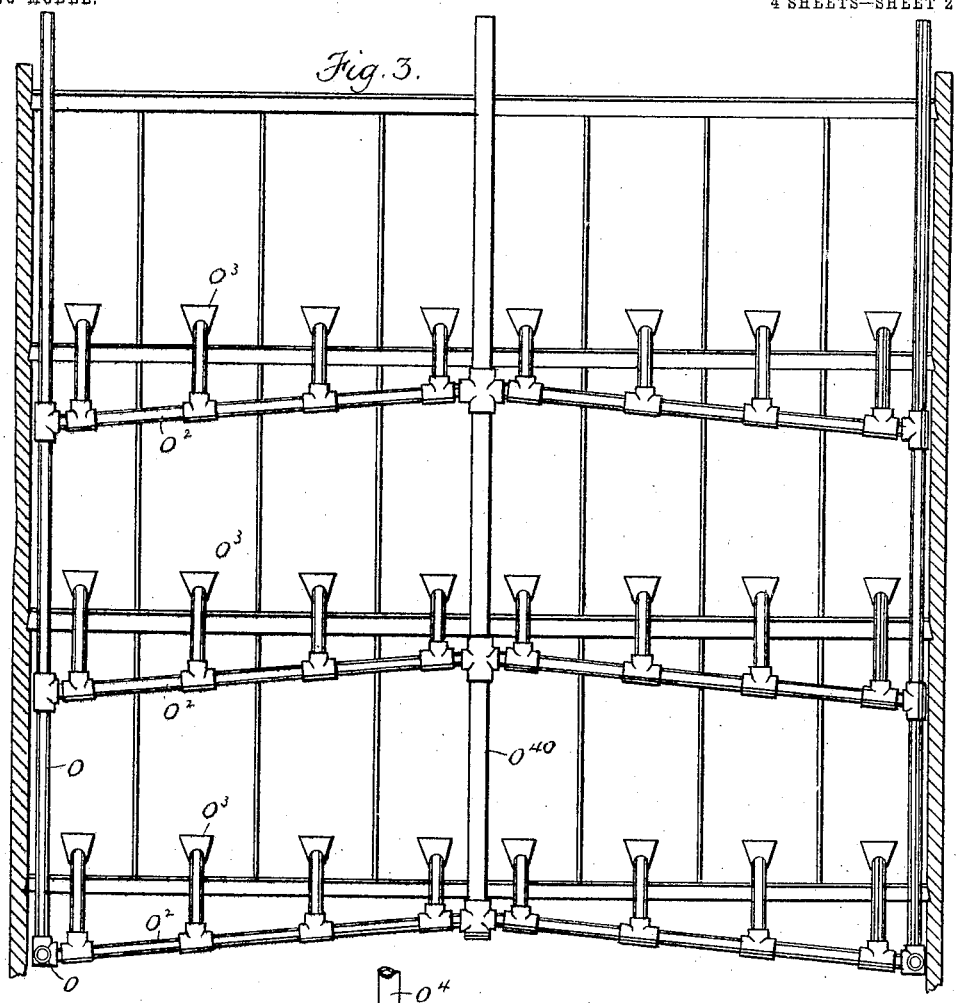
Figure 4:
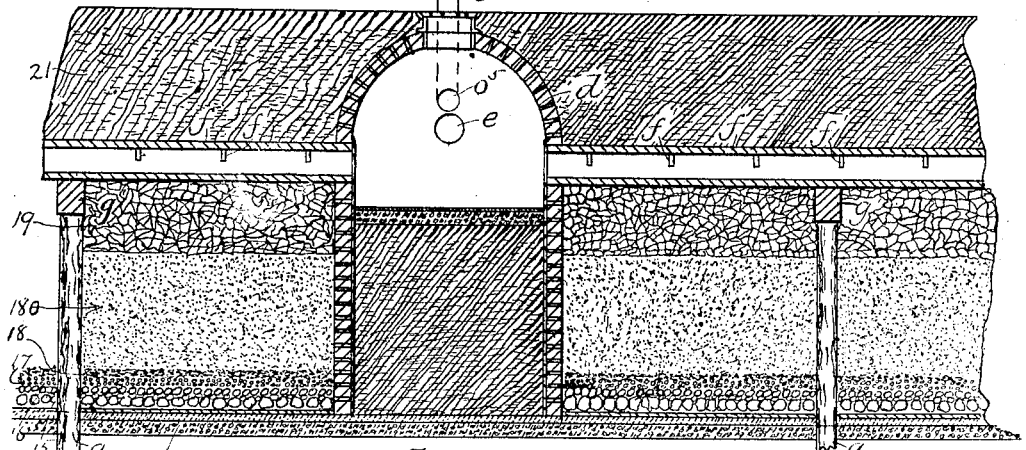
Figure 12:
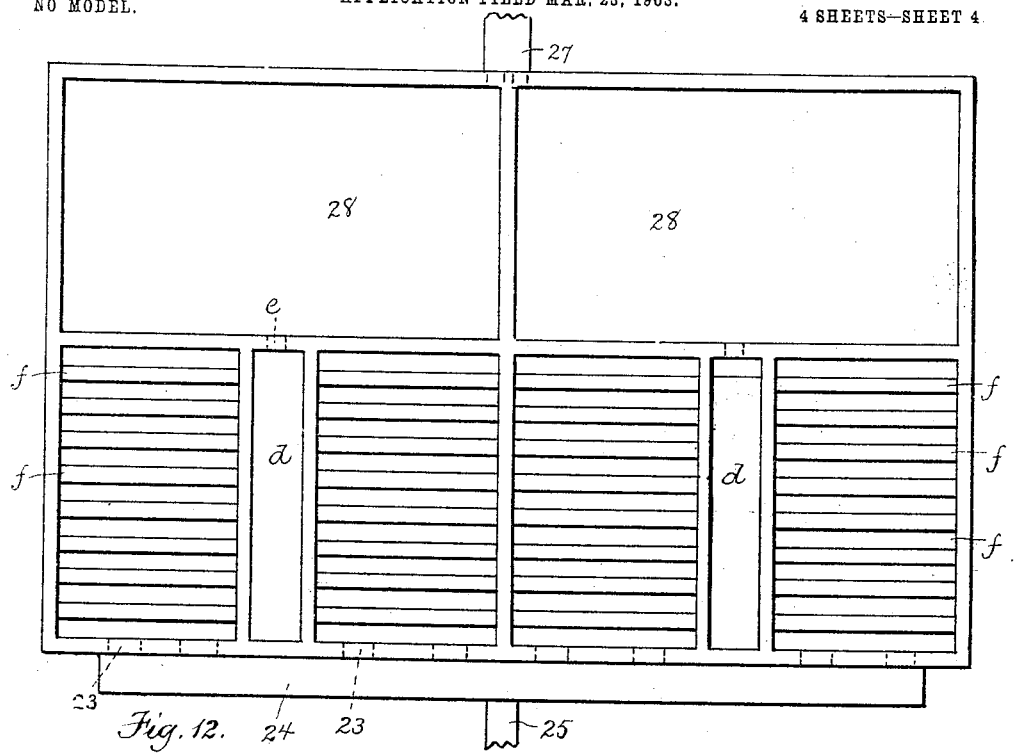
Figure 13:
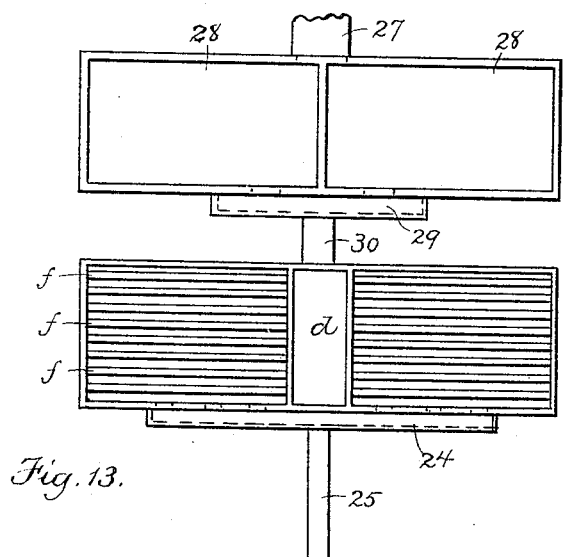

Of the accompanying drawings, forming a part of this specification, Figure 1 represents a sectional plan view of an apparatus embodying my invention. Fig. 2 represents a section on line 2 2 of Fig. 1. Fig. 3 represents a vertical section on line 3 3 of Fig. 1 and an elevation of the parts above said line. Fig. 4 represents a section on line 4 4 of Fig. 1. Fig. 5 represents a section on line 5 5 of Fig. 1. Fig. 6 represents a side elevation of a portion of one of the distributing-conduits. Fig. 7 represents a section on line 7 7 of Fig. 6. Fig. 8 represents a sectional view of one of the primary catch-basins. Fig. 9 represents a section on line 9 9 of Fig. 8. Figs. 10 and 11 represent views of the screen shown in Figs. 8 and 9. Figs. 12 and 13 are plan views of different embodiments of my invention.

The same reference characters indicate the same parts in all the figures.

In carrying out my invention I provide a basin or receptacle for the water to be purified, said basin being of water-tight construction.

*a* represents the floor, and *b* the substantially vertical walls of the basin, these parts being built in any suitable manner and of any suitable materials to insure strength and durability. The floor may be composed of superimposed layers of concrete or grouting, asphalt, and artificial stone, the grouting or concrete being the foundation layer. The walls of the said basin, as well as the walls of the catch-basins hereinafter referred to, are made of brick, the preferred procedure being as follows: The bricks, which are preferably hard-burned, are first heated and are dipped while hot in melted asphalt and are laid in courses while the asphalt is hot. After each course is laid melted asphalt may be poured on the top of the course to fill any crevices between the bricks of the course and to form a cementing layer for the attachment of the next course. The asphalt cements the bricks together as a substitute for mortar and forms an air and liquid tight coating. The walls thus constructed are impervious to air and water and are extremely durable, particularly when externally covered by earth, &c., as in the present case. The asphalt employed is preferably either Trinidad or Neufchâtel. The floor of the basin is preferably constructed with a gentle slope from one side of the basin to the other, the lowest portion of the floor being at the outlet or outlets provided for the discharge of the effluent.

Within the basin is a filtering and purifying bed, (indicated as a whole by the reference-letter *c*.) The preferred construction of said bed is as follows:

15 represents a bottom layer of relatively large rounded water-worn stones, preferably from six to ten inches in diameter, this layer resting on the floor or bottom of the basin.

16 represents a layer of smaller stones, somewhat larger than a goose-egg, resting on the layer 15.

17 represents a layer of stones of about the size of a hen's egg resting on the layer 16.

18 represents a layer of coarse gravel above the stone layers 15, 16, and 17.

180 represents a layer of sand above the layer 18, the layer 180 being preferably from twenty inches to two feet in thickness.

19 represents a layer of chestnut coke, preferably from six inches to one foot in thickness, and resting on the sand layer.

The layers 15, 16, and 17 should be carefully laid by hand, while the gravel, sand, and coke layers may be shoveled on. The layers 15, 16, and 17 provide innumerable spaces or crevices for the downward passage of liquid and for the upward passage of air for ventilation from the outlet or outlets of the basin hereinafter referred to. The gravel layer 18 prevents the sand and other material above it from sifting down into said spaces or crevices.

$d$ represents a gallery which extends across the basin and separates the filtering and purifying bed into two parts. The gallery has an inlet $e$ at one end, through which the waters or liquids to be purified enter. The bottom of the gallery is elevated above the bottom of the basin and is preferably composed of grouting and concrete, the walls of the gallery being preferably of brick and the top arched, the bricks being treated and laid in the manner above described. The walls of the gallery are preferably extended down to rest on the floor of the basin, as shown in Fig. 4. From the gallery $d$ extend a plurality of horizontal conduits $f$, each of which is adapted to discharge numerous small streams of water upon the upper layer 19 of the filter-bed. Each conduit $f$ is preferably an elongated box or tube of rectangular form in cross-section and composed of wooden planks or boards. The said planks are to be kiln-dried or otherwise thoroughly seasoned and boiled or dipped in melted asphalt. They are preferably connected by nails or spikes in lengths of from ten to twenty feet, care being taken to make the joints water-tight. In the upper portions of the vertical side pieces of each conduit are formed small outlets $f'$, the lower ends of which are above the bottom of the conduit and are at the same height to determine the water-level in the conduits, said outlets being preferably about six to twelve inches apart. These outlets may be conveniently formed by cutting narrow slots in the side pieces, as indicated in Figs. 6 and 7, although the outlets may be circular or of any other suitable form. The slots or outlets are formed on both sides of the conduit and are arranged to break joints. The outer ends of the conduits $f$ are closed, so that the water escapes only through the outlets $f'$.

The conduits $f$ are separated from each other by spaces which are preferably of about twelve inches or of the same width as the conduits. In these spaces are placed fillings 20, which rest on the coke or top layer of the filter-bed and are preferably composed of layers of different-sized stones, gravel, and sand, the said layers corresponding to the layers 15, 16, 17, 18, and 180 of the filter-bed. The fillings 20 prevent the earth covering 21, which surmounts the basin and its contents, from sifting through from above and from obstructing the outlets $f'$, and they also permit the free downward flow of the water issuing from said outlets.

The conduits $f$ are supported by piles $g\ g$, extending through the filter-bed and through the floor of the basin into the subsoil and horizontal stringers $g'$, resting on the upper ends of the piles.

It will be seen by reference to Fig. 5 that the bottoms or under sides of the conduits $f$ are practically on the same level as the top of the coke layer 19. The conduits $f$ are located above the bottom of the gallery $d$, as shown in Fig. 4, and the inlet $e$ of the gallery is also elevated above the bottom of the gallery and above the conduits $f$. When water is admitted to the gallery through the inlet $e$, it accumulates in the gallery until it reaches the level of the floors or bottoms of the conduits $f$ and then flows outwardly into the conduits and continues to rise perpendicularly therein until it reaches the outlets $f'$. The water then flows outwardly in numerous small streams through said outlets and downwardly into and through the filtering and purifying bed. In its course through the various layers of the filter-bed the waters or liquids are deprived of the deleterious matter held in suspension therein by absorption, filtration, decomposition, and neutralization, so that by the time it reaches the bottom or floor of the basin it is sufficiently purified. The basin is provided with a suitable outlet or with a series of outlets at or slightly below the level of the floor for the effluent. In Fig. 12 I show outlets 23 23, which discharge the effluent into a trunk, pipe, conduit, or box 24, having a single outlet 25, said trunk, pipe, conduit, or box receiving the effluent from a number of filter-beds. In Fig. 13 I show the outlet 25 connected with a storage tank or reservoir 26. The constructions illustrated in Figs. 12 and 13 are adapted for the purification and subsequent collection of water for drinking and other purposes, the water being received through a supply-conduit 27, communicating with the source of supply and discharging the unfiltered water into two receiving tanks or basins 28. From each tank 28 the water flows through the inlet $e$ of a gallery $d$. The object of the two tanks 28, each connected with a distributing and purifying system, such as above described, is to enable the operation of one tank and the connected apparatus to be discontinued while the silt and other sediment is being removed from its floor or bed, the other part of the apparatus remaining in operation. In Fig. 13 the receiving tanks or reservoirs 28 are shown as separated from the basin containing the distributing, purifying, and filtering means above described, the water from the receiving-basin passing through a conduit 30 to the gallery $d$. The basins 28 may be any desired distance from the gallery $d$ and may be several miles therefrom.

When the above-described apparatus is used for the purification of sewage and the object is to make the effluent inoffensive, so that it may be discharged without objection into watercourses, the outlet from the basin containing the filter-bed may communicate with a sewer or other watercourse.

In Fig. 1 I show the above-described distributing and purifying apparatus as a part of a sewage-disposal system, the gallery $d$ receiving sewage which has been deprived of the greater part of the foreign matter by sedimentation and separation in a primary catch-basin $m$ and a secondary catch-basin $n$. Each of these basins may be made of brick and other material, as above described, and is therefore of durable water-tight construction. The primary basin $m$ receives the sewage from the source of supply through a conduit $o$ and is connected with the secondary basin $n$ at a point below said conduit by a pipe $p$, located above the bottom of the primary basin. The greater part of the foreign or solid matter that enters the primary basin is therefore deposited in the latter by sedimentation and separation, the effluent which passes to the secondary basin through the pipe $p$ being chiefly water. Slight sedimentation and separation again occurs in the secondary basin, the effluent passing from the latter through a pipe $q$, elevated above the bottom of the secondary basin and communicating with the gallery $d$.

In the embodiment of my invention shown in Figs. 1 and 3 the primary catch-basin $m$ receives the sewage discharged from a building $r$, the pipe $o$ being connected with a vertical pipe $o'$ within the building, while the pipe $o'$ is connected with a series of inclined soil-pipes $o^2$, with which the closet-bowls $o^3$ on the different floors communicate. The discharges from said bowls pass through the pipes $o^2$, $o'$, and $o$ into the primary catch-basin. The inclined pipes $o^2$ communicate at their higher ends with a vertical pipe $o^{10}$. I have here shown two series of catch-basins, two series of inclined soil-pipes $o^2$, one series of soil-pipes communicating with one primary catch-basin, while the other series of soil-pipes communicates with the other primary catch-basin. Both series of inclined soil-pipes communicate with the central vertical pipe $o^{10}$.

Means are provided for drawing the foul air and gases from the gallery $d$, its branches $f$, the catch-basins $m$ $n$, and the system of soil-pipes and for discharging the air and gases at an elevated point or points where they will not be objectionable. To this end I extend the pipes $o'$ and $o^{10}$ above the roof of the building, so that they will serve as ventilating-pipes, drawing air and gases from the primary catch-basins and from the soil-pipes $o^2$. I also provide a second ventilating-pipe $o^4$, extending upwardly and fastened to the outside wall, or it may be otherwise supported. Said pipe extends to a suitable height and is connected by a pipe $o^5$ with the gallery $d$ at a point above the inlet $e$, the pipe $o^5$ having branches $o^6$ communicating with the secondary basins $n$ at a point above the liquid-outlets of the latter. The pipe $o^4$ therefore draws air and gases from the gallery $d$, branch conduits $f$, and secondary catch-basins $n$. When the primary catch-basins are supplied with sewage from a different source than that shown, so that the pipes that deliver sewage to the primary basins cannot be depended upon to draw air and gases therefrom, the primary basins will be ventilated through the pipes $p$ and the secondary basins, the pipes $p$ being straight, as shown in Fig. 2, so that they permit the gases above the water-level in the primary basins to pass into the secondary basins. When the primary basins are ventilated through the pipes $o$ $o'$, the connecting-pipes $p$ are preferably extended downwardly in the primary basins, as shown in Fig. 8, so that their receiving ends are sealed by the liquid.

To permit the thorough ventilation of the gallery $d$, I provide the top of said gallery, at a point near the end opposite the inlet or receiving end, with a manhole having a perforated cover $d'$, adapted to admit outside air to the gallery, and thus create a draft and cause the gases in the gallery to move freely to the ventilating-pipe $o^4$ and be drawn upwardly thereby. $d^2$ represents another manhole in the top of the gallery at a point near the inlet end thereof, said manhole having a tight cover. The said manholes enable the gallery to be entered for the purpose of cleaning and repairing the same. The catch-basins are also provided with manholes having suitable covers to permit the removal of the solid matter from time to time.

The entrance of floating matter—such as paper, rags, or other fibrous material—in the primary catch-basin into the connecting-pipe $p$ and secondary basin $n$ is prevented by a screen $s$, made of wire-netting, which is preferably of the elongated form, (shown in Figs. 9 and 10,) and stands in an inclined position between two vertical walls or buttresses $s'$ $s'$. The upper end of the screen is provided with hooks $s^2$, which engage a cross-bar $s^3$, extending between said walls. The screen can therefore be removed, or it can be swung upwardly by means of a chain $s^5$, Fig. 8, to be cleaned and to permit access to the pipe $p$.

The described provision for ventilating all parts of the apparatus obviates in a great measure all nuisance from objectionable odors and all liability of explosions resulting from an accumulation of gases.

It will be seen that the means for distributing the liquid over the filtering and purifying bed, said means comprising the horizontal gallery and the horizontal branch conduits located above the bottom or floor of the gallery and having numerous or innumerable outlets located above their own bottoms, provide for the discharge of the liquid by its dead-level overflow, the liquid coming to a dead-level, or practically so, before being discharged. The liquid rises in the gallery and conduits and overflows at a large number of points without being set in rapid motion at any point. Hence sedimentation goes on to a considerable extent in the gallery and branch conduits. The deposits may be flushed out from time to time. This may be done as follows: The inlets $e$ to the gallery $d$ may be closed with suitable plugs or stoppers to prevent inflow during the cleaning or flushing process. The stoppers may be inserted by access through the manholes above mentioned. The remaining fluid and the mud, ooze, or other settlings are extracted by suction-pumps, access being had through the manholes. The bottom level of the chamber or gallery $d$ being below the bottom of the conduits $f$ allows and causes the fluid and other material in the conduits $f$ by gravity to freely flow or run out into the lower level of the floor of gallery $d$ as the fluid and other substances are pumped from the said gallery. If any settlings on the floors of the gallery $d$ and conduits $f$ are too solid to be removed with the liquid, they can be loosened by proper scrapers made of rubber, wire, or other material and then flushed with water and a proper hose, the hose being projected into the conduits from the gallery. The water will run back to the lower level of the floor of the gallery $d$, carrying the loosened material with it, where it may be extracted by the suction-pump, as in the first instance. In spraying or running the flushing-water into the conduits $f$ it is not necessary to fill the conduits above the lower level of the side slots or outlets $f'$; but should some of the material run over and onto the purifying-beds below it would do no damage, as the amount would be so comparatively small. One of the great advantages of a system constructed after my invention is that it allows the flushing and cleaning of the floors of the galleries and chambers to be easily and practically performed.

It is obvious that the capacity of the apparatus may be increased to any extent desired both by increasing the number and size of the outlets $f'$ and also by increasing the length of the galleries and branch conduits and the area and depth of the filter-beds and the surface covered by the whole, all of which may be determined mathematically by the engineer in charge of the construction of a system of any desired size.

The described apparatus, excepting the building $r$, may be constructed below the surface of the ground in a suitable excavation and afterward covered over, leaving the surface level, or it may be constructed on or above the surface and covered to form an elevation, which may be terraced and covered with grass, flowers, &c. This statement applies to apparatus for the treatment of sewage as well as of water.

The apparatus of my invention is adapted to be operated wholly by gravitation and without pumping means of any kind, a difference of five feet between the height of the outlet of the catch-basins and the bottom of the main basin supporting the filtering and purifying bed being sufficient to cause the described circulation and distribution by gravitation alone. It is obvious, however, that vacuum or other suitable pumps may be employed in connection with said apparatus, if desired.

As already stated, the bottom of the gallery $d$ is lower than the bottoms of the branch conduits $f$, while the lower ends of the outlets $f'$ are above the bottoms of the conduits $f$. The bottoms of the branch conduits are horizontal and all on the same level, and the lower ends of the outlets $f'$ are also all on the same level. Storage capacity is thus afforded below the level of the outlets, both in the gallery and in the branch conduits, so that the liquid first entering the gallery accumulates therein and rises perpendicularly and gradually throughout the whole extent of the gallery and of the branch conduits until it reaches the outlets and then overflows from said outlets. The entire movement of the liquid in the gallery and branch conduits is gradual and gentle and is mainly perpendicular, there being no energetic longitudinal currents. This action is particularly favorable to sedimentation or the deposition of mud or other sedimentary matter on the bottoms of the gallery and conduits. The level of the branch conduits $f$ and the supporting-stringers $g'$ is to be carefully established by the use of a transit instrument or other leveling instrument of precision, it being very important that said conduits be maintained at a uniform level, so that the most remote outlet $f'$ will discharge practically the same quantity of liquid as the outlet nearest the gallery. This is a matter of great importance.

The gallery $d$ and the branch conduits $f$ may be used without a filtering and purifying bed and simply as a means for distributing water for irrigation and for other purposes. A distributing system such as above indicated would comprise a central or main conduit $d$, a series of branch conduits $f$, separated from each other by spaces of sufficient width to receive the plants, trees, or shrubs to be irrigated, piles to support the branch conduits, and means for preventing pulverized earth, sand, &c., from reaching and obstructing the outlets $f'$, said means comprising layers of stones and gravel placed against the vertical sides of the conduits. The water discharged will find its way to the roots in the soil between the branch conduits. The gallery and branch conduits may be covered with soil, which may be utilized above the conduits for plants, vegetables, &c.

Having thus explained the nature of my invention and described a way of constructing and using the same, although without having attempted to set forth all the forms in which it may be embodied or all of the modes of its use, I declare that what I claim is—

1. An apparatus of the character described comprising a receiving-gallery, a plurality of horizontal discharge-conduits leading from said gallery at a point above the bottom of the latter, each conduit having a plurality of contracted outlets located above the bottom thereof, an internal sediment-space being formed below the plane of said outlets, and a filter-bed arranged to receive the effluent from said outlets.

2. An apparatus of the character described, comprising a receiving-gallery, a plurality of horizontal discharge distributing-conduits extending outwardly from the gallery, each conduit having a plurality of outlets located above its bottom and an internal space for sediment below said outlet, a filter-bed arranged to receive the effluent from said conduits, and supports for the conduits, said supports including piles extending vertically through and below the filter-bed, and stringers supported by the piles and extending crosswise of the conduits, whereby the conduits are maintained in a horizontal position.

3. An apparatus of the character described, comprising a receiving-gallery, and a plurality of horizontal discharge-conduits leading from said gallery at a point above the bottom of the latter, each conduit being composed of an elongated box having vertical sides provided with contracted outlet-openings in their upper portions, the bottoms of said conduits being below the lower edges of said outlets.

4. An apparatus of the character described comprising a water-tight basin having a substantially horizontal bottom and substantially vertical walls, a filter-bed composed of filtering material superimposed on said bottom and surrounded by said walls, a gallery formed in said basin, and conduits leading directly from said gallery at a point above the bottom of the latter, each conduit having lateral openings arranged to distribute the liquid to be filtered over said filter-bed, an outlet for the effluent being provided at or near the bottom of said receptacle.

5. An apparatus of the character described, comprising a water-tight receptacle, having a substantially horizontal bottom and substantially vertical walls coated internally with asphalt, a filter-bed in said receptacle, a receiving-gallery extending across the top of said bed, and horizontal conduits leading from said gallery at a point above the bottom thereof, each conduit having a plurality of outlets located above the conduits and discharging onto the top of the bed.

6. An apparatus of the character described, comprising a receiving-gallery, a series of horizontal branch conduits extending therefrom at a point above the bottom thereof and provided with lateral openings, and a filter-bed arranged beneath said conduits to receive the liquid overflowing from said openings.

7. An apparatus of the character described, comprising a covered receiving-gallery, horizontal distributing-conduits leading therefrom and each having a plurality of lateral outlets, a filter-bed below said conduits, a covering above the conduits, and means for drawing air and gases from said gallery and conduits.

8. An apparatus of the character described, comprising a covered receiving-gallery, horizontal branch conduits extending therefrom and each having a plurality of outlets, a filter-bed below said conduits, a covering above the conduits, a catch-basin adapted to deliver liquid to said gallery, an elevated ventilating pipe or flue, and connections between said flue, and the gallery and catch-basin, whereby the flue is caused to draw air and gases simultaneously from the gallery and basin.

9. An apparatus of the character described, comprising a filter-bed, covered conduits adapted to discharge onto the bed, a series of catch-basins communicating with each other and with said covered conduits, and means for drawing air and gas simultaneously from the conduits and from the catch-basins.

10. An apparatus of the character described, comprising a filter-bed, covered conduits adapted to discharge onto the bed, a series of catch-basins communicating with each other and with the covered conduits, a system of soil-pipes discharging into the primary catch-basin, and means for drawing air and gases simultaneously from the soil-pipes, the catch-basins, and the covered conduits.

11. An apparatus of the character described, comprising a receiving conduit or gallery, and a plurality of branch conduits extending outwardly from the gallery and having vertical sides, each conduit having a plurality of vertically-elongated slots in its sides, the lower ends of said slots being above the bottoms of the conduits.

12. In an apparatus of the character described, a branch distributing-conduit comprising an elongated covered box or tube closed at its outer end and having outlets formed in the upper portions of its two vertical side pieces, an internal sediment-space being formed below the plane of the lower edges of said outlets, and a ventilating-channel above the same.

13. In an apparatus of the character described, means for effecting a primary deposit and sedimentation comprising a catch-basin having an outlet or discharge pipe, and a screen covering the latter, in combination with means for effecting a final deposit and sedimentation, comprising a filtering apparatus, and means for conducting liquids from said catch-basin to said filtering apparatus and means for ventilating said catch-basin and conducting means.

14. A filtering and purifying apparatus comprising horizontal layers of grouting or concrete, artificial stone, asphalt, stones of different sizes, gravel, silex and chestnut coke, a series of liquid-distributing conduits above the coke layer, said conduits having outlets in their sides, fillings of stones of different sizes between said conduits, gravel above the said filling, and a covering of earth surmounting the whole.

15. An apparatus of the character described, comprising a plurality of horizontally-arranged conduits having vertical sides and edges adapted to receive the waters or liquids to be distributed and purified, and having provisions for holding an accumulation of said waters or liquids until the same comes to a dead level on a plane below the tops of said conduits, and for discharging the liquids in a plurality of fine streams by overflow from the same level and above the bottom of the accumulation, and means for ventilating said conduits.

16. A system for the treatment and disposition of water, sewage liquids, or other liquids; comprising filtering-beds, and means for bringing said liquid or water to a dead-level or practically so and for causing it to overflow and distribute itself over said filtering-beds, and means for ventilating the air-space immediately above the surface of said liquid or water before the same overflows.

17. A system for the treatment and disposition of water, sewage liquids, or other liquids, comprising filter-beds and covered channels, tubes or pipes, such as described, whereby said water or liquid may be evenly and equally distributed over the filter-beds, the liquid being first brought to a dead-level, or practically so on a plane below the tops of said channels, tubes and pipes, and caused to discharge or overflow from said level, and means for ventilating the air-space immediately above the surface of said liquids while the same is coming to said dead-level in said channels, tubes and pipes.

18. A system for the treatment and disposition of water, sewage liquids, or other liquids, comprising an overflow system, means whereby said liquids or water is brought to a dead-level or practically so before it can overflow, discharge or distribute itself, whereby rippling or unevenness of the surface of said water or liquid is obviated, and means for ventilating the air-space immediately above the surface of said liquid while the same is coming to said dead-level in said overflow system.

19. A system for the treatment and disposition of water, sewage liquid or other liquids, comprising a plurality of covered channels having overflow-outlets in a plane below the tops of said conduits, the channel-beds being below said outlets, whereby the water or liquids will rise to an even or uniform level in said channels, and means for ventilating the air-spaces in said channels immediately above the surface of said liquid before the same overflows.

20. A system for the treatment and distribution of water, sewage liquid or other liquids, comprising a plurality of covered supply and distribution channels having oulet or overflow points located on a plane below the tops thereof, the bottoms of said channels being located below the level of their respective overflow-points, and means for ventilating the air-spaces in said channels immediately above said liquids before the latter reaches the overflow-points.

21. A system for the distribution and treatment of water, sewage liquid or other liquids, comprising a plurality of covered channels having overflow-outlets located on a plane below the tops thereof, and provided with sediment-chambers below the level of said overflow-outlets, and means for ventilating said channels.

22. A system for the treatment and disposition of water, sewage liquid or other liquids, comprising a plurality of covered channels each provided with a plurality of lateral overflow-outlets located on a plane below the tops thereof, the beds of said channels being below the level of said overflow-outlets, means for supplying fluids to said channels, means whereby said fluids are caused to rise perpendicularly and uniformly to the level of said overflow-openings and means for ventilating said channels.

In testimony whereof I have affixed my signature in presence of two witnesses.

SILVANUS F. VAN CHOATE.

Witnesses:
A. D. HARRISON,
P. W. PEZZETTI.